H. KAUFMAN.
PROTECTIVE DEVICE FOR GAS METERS AND THE LIKE.
APPLICATION FILED OCT. 25, 1912.

1,077,409.

Patented Nov. 4, 1913.

WITNESSES
Harry Jacobson
Albert A. Finkelstein

INVENTOR
Herman Kaufman
BY
George Finkelstein
ATTORNEY

UNITED STATES PATENT OFFICE.

HERMAN KAUFMAN, OF NEW YORK, N. Y.

PROTECTIVE DEVICE FOR GAS-METERS AND THE LIKE.

1,077,409.     Specification of Letters Patent.     Patented Nov. 4, 1913.

Application filed October 25, 1912. Serial No. 727,636.

*To all whom it may concern:*

Be it known that I, HERMAN KAUFMAN, of the city, county, and State of New York, have invented certain new and useful Improvements in Protective Devices for Gas-Meters and the like, of which the following is a specification.

My device has for its object the provision of means that will prevent persons tampering with the operation of a gas meter or other meter to which my device can be attached by holding in check the movement of the valves within the meter so that the registering device of the meter does not register the full volume of gas used or passing through the meter, the tampering with the meter being usually accomplished by blowing into the outlet pipe of the meter or by blowing dirt into the outlet pipe so as to prevent the registering device registering the full amount of gas used.

A further object of my device is to stop the supply of gas when the meter has been tampered with by any person unauthorized to do so and to make it necessary in order to have the supply of gas restored that some authorized person or the owner of the gas meter be notified and thus be given notice that an unauthorized or malicious party has endeavored to tamper with the meter thus preventing the recurrence of such tampering or attempted misuse of gas.

To the accomplishment of the aforesaid objects my invention consists in the peculiar novel construction, arrangement and combination of parts hereinafter described in the specification and more particularly pointed out in the claims. Reference being had to the accompanying drawing forming a part of this specification wherein like numerals of reference denote like parts throughout the specification.

Figure 1:
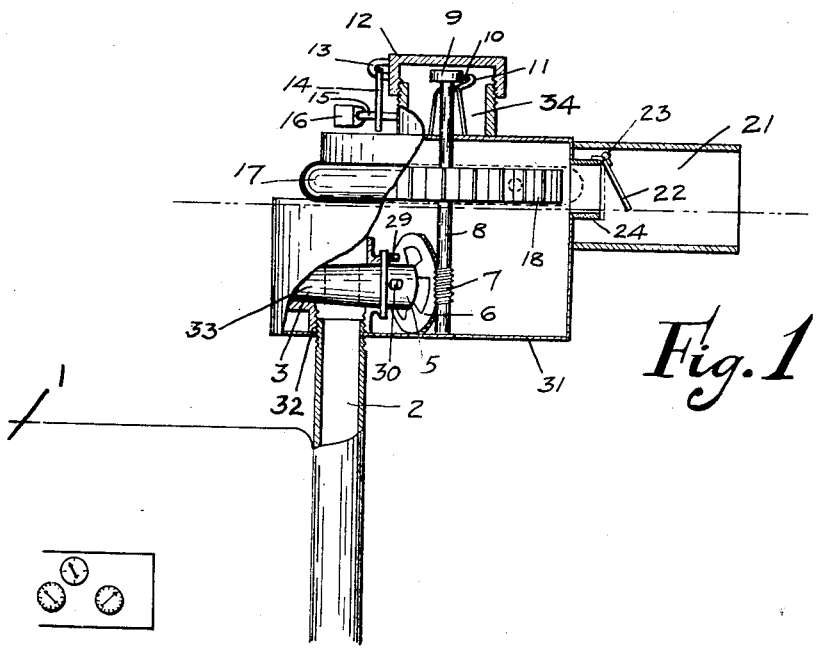
Figure 2:
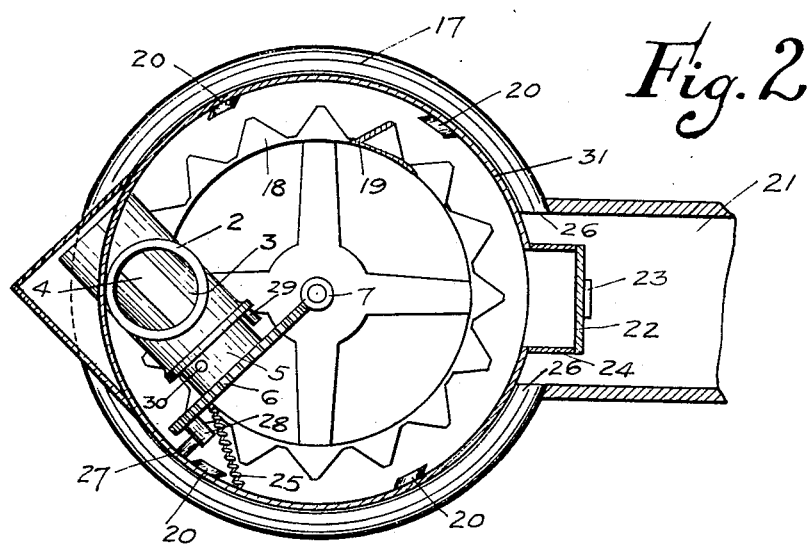

Figure 1 is a front view of my device showing same attached to the outlet pipe of the gas meter. Fig. 2 is a combined bottom and horizontal sectional view of my device.

Referring more specifically to the drawings, 1 denotes a gas meter of any well-known type, only sufficient of the gas meter being shown to explain my invention. My device is fastened or screwed to or soldered solidly upon the meter pipe 2. My device consists of an air tight casing 31 made of brass, steel, or other suitable metal which can be made in any well-known manner, having a pipe 32 the bottom end of which is to be attached to the pipe 2 of the meter 1. The top part forms a valve seat for the valve 3 which consists of an outer valve barrel 33 and an inner valve barrel 5 revolubly fitted in said outer valve barrel. The outer valve barrel 33 has openings 4 at the top and bottom of said valve barrel and the inner valve barrel 5 has similar openings which are normally in juxtaposition with the openings 4 in the outer valve barrel 33. The inner valve barrel when revolved will close the openings in the outer valve barrel 33. The outer valve barrel preferably forms part and is solidly attached to the pipe 32. Attached to the inner valve barrel 5 is the gear wheel 6 which meshes with the worm 7 on the worm shaft 8. This worm shaft 8 is loosely mounted and supported within the casing 31 so that it will revolve very easily. Above the worm 7 and directly opposite the pipe 24 of the casing is the fan 18 which is solidly attached to the worm shaft 8. The casing has an outlet pipe 21 within which is a smaller pipe 24 which is so placed that it approaches somewhat nearer to the upper wall of the pipe 21 at its outer extremity. This inner pipe 24 has a check door or valve 22 which is attached to the outer extremity of the pipe by means of the hinge 23. Extending around said casing is the pipe 17 which has openings 26 into the outlet pipe 21. This pipe 17 has several small pipes 20 attached to this pipe 17, these small pipes 20 being at such an angle so that air blown in through the pipe 21 into the openings 26 will strike the vanes 19 of the fan 18 at right angles.

At the top of the shaft 8 is a hand nut 9 which has a lug 10 which comes in contact with the stop 11 when said hand nut has reached its highest desired position. The top of the casing has an opening 34 and a cap 12 which is to be screwed on or suitably fitted to close the opening 34 and make same air tight. This cap 12 is held in position and kept firmly locked to the casing 31 by means of any suitable locking device.

I show an ordinary locking device consisting of a link 15 attached to the casing 31 and a link 14 suitably attached to the link 13 which is attached to the cap 19. When the link 14 is placed over the link 15, the two links can be kept together by means of an ordinary lock 16 fastened over them.

The pipe 21 takes the place of the outlet pipe 2 of the meter. Normally the openings 4 in the valve barrels are in juxtaposition with each other, so that gas may pass from the meter 1 through the openings 4 in the valve barrels, into the casing 31 and through the inner pipe 24 into the outer pipe 21 and from the pipe 21 into any pipes which are attached to this pipe 21. The check valve or door 22 of the inner pipe 24 is forced open by the flow of the gas. As soon as the flow of the gas is stopped, this check valve closes by its own weight and moreover closes very easily, owing to the fact that the pipe 24 is slightly bent upward. Should any person endeavor to tamper with the meter by blowing into the outlet pipe 21, he would blow into the openings 26 of the pipe 17, the air being forced through the small pipes 20 directly against the vanes of the fan 18 which would cause the fan to revolve and carry with it the worm shaft 8 which would cause the gear wheel 6 which is attached to the inner valve barrel 5 to revolve, thus causing the inner valve barrel to revolve within the outer valve barrel and prevent any further flow of gas from the pipe 2 into the casing 31.

The outer valve barrel has a lug 29 and the inner valve barrel has a lug 30. These two lugs will come in contact and prevent further movement on the part of the inner valve barrel when the openings 4 in the outer valve barrel have been closed by the inner valve barrel. Gear 6 has a lug 28 extending partly outwardly from same which co-acts with the lug 27 attached to the inner wall of the casing 31, to prevent further movement of the gear when the openings 4 are in proper juxtaposition with each other. The hand nut 9 also has a lug 10 on same which co-acts with the stop 11 so as to prevent the worm shaft 8 from revolving when the openings 4 in the valve barrels are in proper juxtaposition with each other.

The tension spring 25, one end of which is attached to the inner wall of the casing 31; the other end to the gear wheel 6, is also for the purpose of preventing any unnecessary movement on the part of the worm gear 6, when the openings in the valve barrels have come in proper juxtaposition with each other. In order to reopen the valve 3, the shaft 8 must be turned in the opposite direction by means of the hand nut 9 and to get at this hand nut 9, the cap 12 must be removed. This cap normally is locked in any well known manner or as shown in the drawing by means of the link locks 14 and 15.

I do not limit myself to this specific construction of the parts shown in the drawing as it is evident that various changes can be made in the construction of the outer casing locking device and other parts forming a part of the construction of my device, without departing from the scope of my invention.

What I claim is:

1. In a device of the character described, the combination of an outer casing, means for connecting said casing with the outlet pipe of a meter, an outlet pipe attached to said casing, a valve, and means for permanently locking said valve until properly unlocked actuated by blowing into said casing outlet pipe.

2. The combination with the outlet pipe of a gas meter, of an outer casing suitably attached to said meter outlet pipe, an outlet pipe attached to said casing, and locking means interposed between said meter outlet pipe and said casing outlet pipe actuated by blowing into said casing outlet pipe, for permanently preventing the flow of gas from said meter outlet pipe until said locking means are properly unlocked.

3. A device of the character described, having an outer casing, an inlet pipe, an outlet pipe, and locking means within said casing actuated by blowing into said outlet pipe for permanently preventing a flow of gas into said casing through said inlet pipe until said locking means are properly unlocked.

4. A device of the character described having an outer casing, an inlet pipe, an outlet pipe, and a revoluble shaft suitably positioned within said casing and having a valve to open or close said inlet pipe, said valve being operatively connected to said shaft, a fan attached to said shaft, means for diverting the returning gaseous substances around the outside of said casing and means for causing the said returning gaseous substances to revolve said fan.

5. A device of the character described, having an outer casing, an inlet pipe, an outlet pipe, a revoluble shaft suitably positioned within said casing and having a valve to open or close said inlet pipe, said valve being operatively connected with said shaft, and a fan attached to said shaft at the part where said shaft passes said outlet pipe, and means at the opposite end of said shaft from said valve for turning said shaft by hand.

6. A device of the character described, having an outer casing with an opening at the top thereof, a removable cap to fit said opening, an inlet pipe, an outlet pipe, and a revoluble shaft suitably positioned within said casing and having a valve to open or close said inlet pipe, said valve being operatively connected with said shaft, and a fan attached to said shaft at the part where said shaft passes said outlet pipe.

7. A device of the character described, having an outer casing with an opening at the top thereof and a removable cap to fit said opening, means for locking said cap to said casing, an inlet pipe, an outlet pipe, and a revoluble shaft suitable positioned within said casing, and having a valve to open or close said inlet pipe, said valve being operatively connected with said shaft, and a fan attached to said shaft at the part where said shaft passes said outlet pipe.

HERMAN KAUFMAN.

Witnesses:
 IRVING FINKELSTEIN,
 C. COHEN.